US006178440B1

(12) United States Patent
Foster et al.

(10) Patent No.: US 6,178,440 B1
(45) Date of Patent: *Jan. 23, 2001

(54) DISTRIBUTED TRANSACTION PROCESSING SYSTEM IMPLEMENTING CONCURRENCY CONTROL WITHIN THE OBJECT REQUEST BROKER AND LOCKING ALL SERVER OBJECTS INVOLVED IN A TRANSACTION AT ITS START

(75) Inventors: Richard Daniel Foster, Fordingbridge; Gordon Douglas Hutchison, Chandlers Ford, both of (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/887,800

(22) Filed: Jul. 3, 1997

(30) Foreign Application Priority Data

Jan. 25, 1997 (GB) .................................. 9701566

(51) Int. Cl.[7] .............................. B06F 15/16; G06F 9/00
(52) U.S. Cl. .......................................... 709/201; 709/303
(58) Field of Search ... 707/103, 8; 395/200.31–200.33, 395/200.4, 683; 709/201–203, 210, 303

(56) References Cited

U.S. PATENT DOCUMENTS

| 5,319,780 | * | 6/1994 | Catino et al. ............................. 707/8 |
| 5,457,797 | * | 10/1995 | Butterworth et al. ................. 395/682 |
| 5,809,506 | * | 9/1998 | Copeland .............................. 707/103 |
| 5,969,967 | * | 10/1999 | Aahlad et al. ............................. 700/2 |
| 6,006,230 | * | 12/1999 | Ludwig et al. ......................... 707/10 |
| 6,012,081 | * | 1/2000 | Dorn et al. ............................. 709/102 |
| 6,012,094 | * | 1/2000 | Leymann et al. ..................... 709/230 |
| 6,044,501 | * | 3/2000 | Holdsworth et al. ................. 709/229 |
| 6,101,501 | * | 8/2000 | Breslau et al. ....................... 707/103 |

FOREIGN PATENT DOCUMENTS 2 661 997   11/1991  (FR) .

OTHER PUBLICATIONS

Takuma Sudo, "Infrastructure for Distributed Objects", Hitachi Review vol. 45, No.3, Jun. 1996, pp. 155–160.

W Cellary et al, "On Hierarchial Locking of Composite Objects", Microprocessing and Microprogramming vol.37, Nos. 1/5, Jan. 1993, pp. 127–130.

Takuma Sudo et al, "Transaction Processing in Distributed Environments", Hitachi Review vol.45, No. 2, Apr. 1996, pp. 55–60.

C S Smith et al, "Cybercut: A World Wide Web Based Design–to–Fabrication Tool", Journal of Manufacturing Systems, vol. 15, No.6, 1996, pp. 432–442.

R Orfali et al, "The Essential Distributed Objects Survival Guide", 1996, John Wiley & Sons, Inc., New York, pp. 67–68, 123–138.

* cited by examiner

Primary Examiner—Ahmad F. Matar
Assistant Examiner—Andrew Caldwell
(74) Attorney, Agent, or Firm—Wayne L. Ellenbogen; Anne Vachon Dougherty (57) ABSTRACT

A computer system and method for performing concurrency control on work requests, the system having an object request broker for receiving work requests and for dispatching them for execution within the computer system, a processor for processing the requests which have been received by the object request broker, and a concurrency control component in the object request broker for performing concurrency control by isolating the effects of a group of related work requests which form a transaction. The method includes the steps of receiving a work request, analyzing the requested object and method related to the work request, and locking the brokering of the method.

12 Claims, 5 Drawing Sheets

DISTRIBUTED TRANSACTION PROCESSING SYSTEM IMPLEMENTING CONCURRENCY CONTROL WITHIN THE OBJECT REQUEST BROKER AND LOCKING ALL SERVER OBJECTS INVOLVED IN A TRANSACTION AT ITS START

FIELD OF THE INVENTION

The invention relates to the field of computer systems, for example, client/server (also known as "distributed") computing systems, where one computing device ("the client") requests another computing device ("the server") to perform part of the client's work.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Application 0 677,943 A2. These latter two publications are hereby incorporated by reference. However, an example, of the basic architecture will be given below for contextual understanding of the invention's environment.

Figure 1:
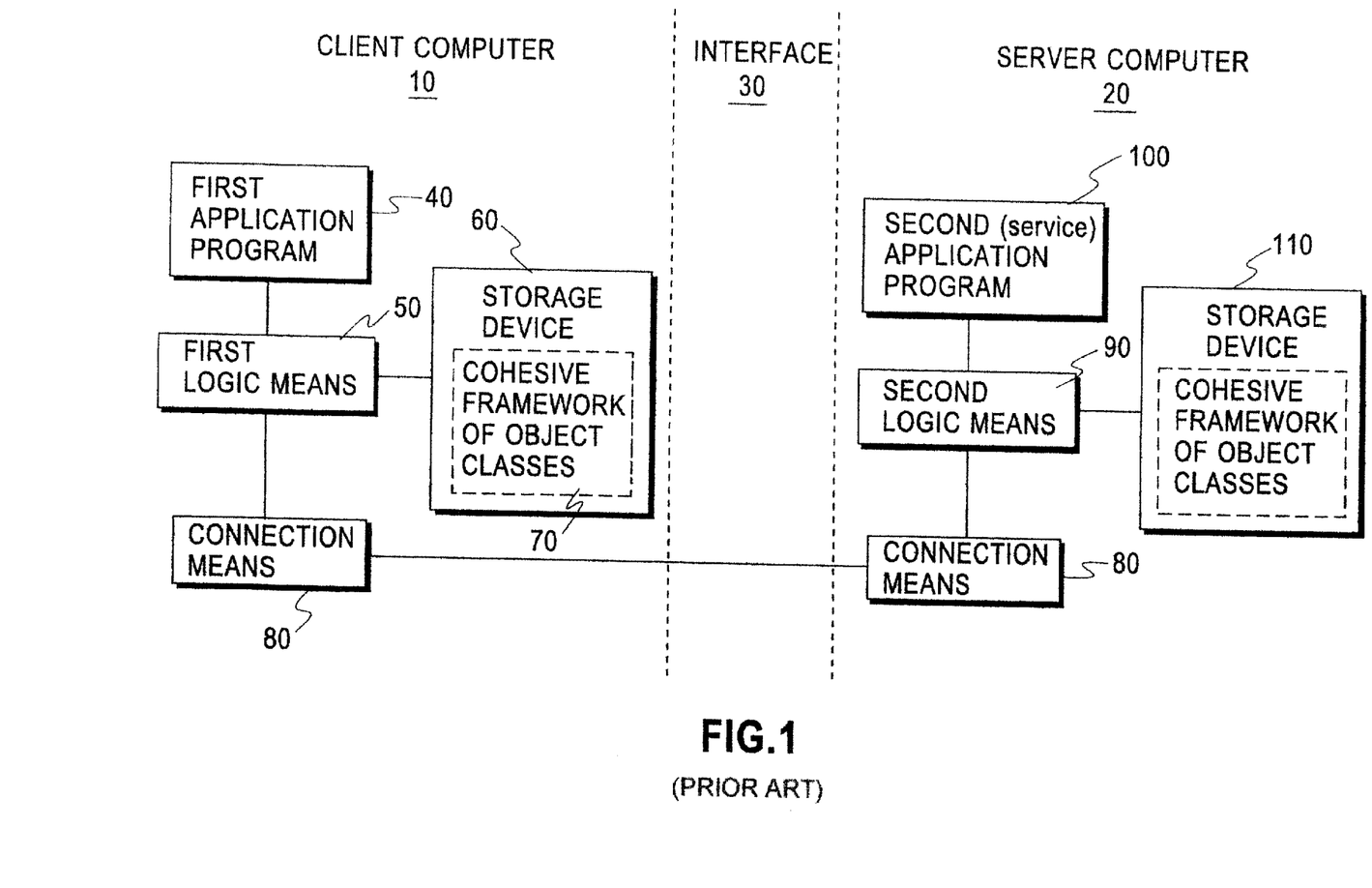
FIG. 1 is a block diagram of a well-known heterogeneous client/server architecture using object technology, in the context of which preferred embodiments of the present invention can be applied.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called either the service or server application) running on the server computer 20 so that the service application 100 can perform the specific task required by that request, such as running a data retrieval procedure. Once this task has been completed the service application may need to send results back to the first computer 10. The service application 100 interacts with the second logic means 90 during the performance of the requested tasks and when results are to be sent back to the first computer 10. The second logic means 90 establishes instances of objects, and invokes appropriate methods of those objects, as and when required by the service application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (ORB) has been defined, which provides the object-oriented bridge between the client and the server machines. The ORB decouples the client and server applications from the object oriented implementation details, performing at least part of the work of the first and second logic means 50 and 90 as well as the connection means 80. The ORB also handles all interactions amongst various server objects of the service application 100.

Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller machine (ATM) as well as bank balances managed by a bank's main computer. Such transactions involve one particular client computer (e.g, 10) communicating with one particular server computer (e.g., 20) over a series of client requests which are processed by the server.

In typical client/server systems, client and server systems are each contributing to the overall processing of such transactions. Further, many different clients may be concurrently attempting to use the same server to engage in separate transactions. For example, many different banking ATM machines (client systems) may be trying to concurrently begin transactions so as to access data from a popular database program running on the bank's large central server. Further, there are even many different intra-server requests (i.e., requests passing from one server object to another server object) which may be part of separate (concurrent) transactions. In these situations, the server must be able to isolate these concurrent transactions so that they do not affect each other. That is, until one transaction is finished (either all parts are committed or all parts are aborted) other transactions trying to access the same server objects must be made to wait. The server objects which are involved in a transaction must be locked while the transaction is pending. Locking prevents extra-transactional concurrent accesses to the server objects which would effect the present transaction.

For example, if a husband is trying to transfer $2000 from a family's checking account into the family's higher interest paying savings account at an ATM machine at one bank on one side of town and his wife is attempting to perform the same function at another ATM (owned by a different bank) on the other side of town, the server must be able to deal with this situation effectively so that the two concurrent transactions do not create a problem for the bank owning the database server.

The way this problem is typically solved in the object oriented programming context is for the server database program (server or service application program 100) to be written so as to not only perform the substantive functions of the program but also to perform transactional locking on concurrent accesses. That is, the server application 100 would be written so that it would lock access to the family's account data stored in the database once a first client (e.g. the husband's ATM) requests access. Then, the husband's transaction would continue in isolation despite the fact that the wife's transaction has been requested concurrently. The wife's client ATM would not be granted access to the data because the husband's client ATM would already have a lock on the object encapsulating this data.

Placing the concurrency control responsibility in the server application (e.g. server application program 100) requires that the server application programmer include the complex locking schemes into his/her program. Also, the programmer must have an in-depth knowledge of transaction theory in order to be able to incorporate the transaction context into the concurrency control aspects of the program. Many application programmers do not have knowledge of such concurrency control and/or transaction theory. Even if they do, incorporating such aspects into the server application adds an extra level of programming complexity to their task in writing the substantive functionality of the server application.

SUMMARY OF THE INVENTION

According to one aspect, the present invention provides a computer system comprising: means for receiving work requests and dispatching them for execution within said computer system; means for processing said requests which have been received by said means for receiving and dispatching, to perform the requested work; and means for performing concurrency control with respect to concurrent requests, said means for performing concurrency control being located within said means for receiving and dispatching.

As concurrency control takes place within the means for receiving and dispatching requests, the actual means for processing requests (the server object instances) are not required to include concurrency control mechanisms. This greatly simplifies the development of server applications. The server application developer does not need to know details about concurrency control or transaction theory and can focus instead on developing the substance of the server application.

In one embodiment, said means for receiving and dispatching is an Object Request Broker. In another embodiment, said means for receiving and dispatching is an object-oriented programming language interpreter.

Preferably, said means for performing concurrency control isolates the effects of a group of related work requests which form a transaction.

According to another aspect, the present invention provides in a computer system, a process for performing concurrency control on work requests comprising the steps of: (a) receiving a work request; (b) analyzing a requested object and method included in said work request; and (c) locking the brokering of said method.

Preferably, said analyzing step (b) includes sub-steps of: (b1) checking whether said first work request is requesting access to said object's fundamental state data of a basic type that maps directly to the storage media of the computer system; and (b2) checking whether said first work request is part of a current transaction.

Preferably, said analyzing step (b) further includes sub-steps of: (b3) checking whether the object associated with said work request is already locked by a previous request belonging to the same transaction as said work request; and (b4) checking whether the object associated with said work request is already locked by a conflicting lock belonging to a transaction different from the transaction of said work request.

Preferably, said locking step (c) includes sub-steps of: (c1) creating a stack of object instances as said work request is transferred from said requested object to at least one other object that said requested object calls; (c2) checking said stack to determine the object at the top level of containment and the object at the bottom level of containment; and (c3) applying an intent lock on said object at the top level of containment. The locking step preferably further includes sub-steps of (c4) applying intent locks on any remaining objects in the stack from the top-level of containment down to, but not including, the bottom level of containment; and (c5) applying a read or write lock on said object at the bottom level of containment.

In the first embodiment, at said sub-step (c2) an attribute tag of a container object class definition is examined to determine the level of containment.

Preferably, said computer system is a server, and said work requests are received at said server from at least one client computer system on a heterogeneous platform.

In the first embodiment, the steps (a), (b) and (c) are performed by an Object Request Broker. In the second embodiment, said steps (a), (b) and (c) are performed by an object-oriented programming language interpreter.

According to another aspect, the invention provides a computer program product stored on a computer-readable storage medium for performing the functions of any of the processes discussed above.

DETAILED DESCRIPTION OF THE PREFERRED EMBODIMENTS

A preferred embodiment of the present invention includes an ORB brokering requests from client to server (as well as intra-server requests between two server objects), with the client and server located on separate machines. However, the client and server can actually be both located on the same machine, with one object on the machine requesting a service of another object on the same machine, such request passing through the machine's ORB along with all other inter-object requests. The basic flow of concurrency control which takes place inside the ORB according to the preferred embodiment will now be described with respect to FIG. 2. This type of control is dealing with the problem of concurrent requests for access to the same server object. For example, if one request belonging to one transaction is trying to examine the contents of a server object's encapsulated data, a later request belonging to another transaction should not be allowed to alter this data while the first request is still examining the data. Also, if a current request belonging to one transaction is trying to change the contents of a server object's encapsulated data, a later request belonging to another transaction should not be permitted to examine the contents of this data until the current request has finished altering the data.

In FIG. 1 the server 20's ORB is embodied in the connection means 80 and the second logic means 90. This server ORB brokers all inter-object communication having to do with server 20. This inter-object communication includes not only communication between an object of server 20 and an object of client 10 but also communication between two objects of server 20. Whenever the server's ORB receives such an inter-object request, the server performs its usual functions, such as analyzing the request to determine which server object (target object) this particular request is requesting access to (step 201 of FIG. 2). For example, if a bank customer, using a client ATM, requests a withdrawal from his checking account, the server object he is requesting access to would be a server object containing data relating to his particular account (account number, balance, conditions etc.). The requested withdrawal operation is known as a "method" of the server object checking account. The server object responds by invoking a method on its encapsulated data relating to the checking account.

Figures 2, 2A:
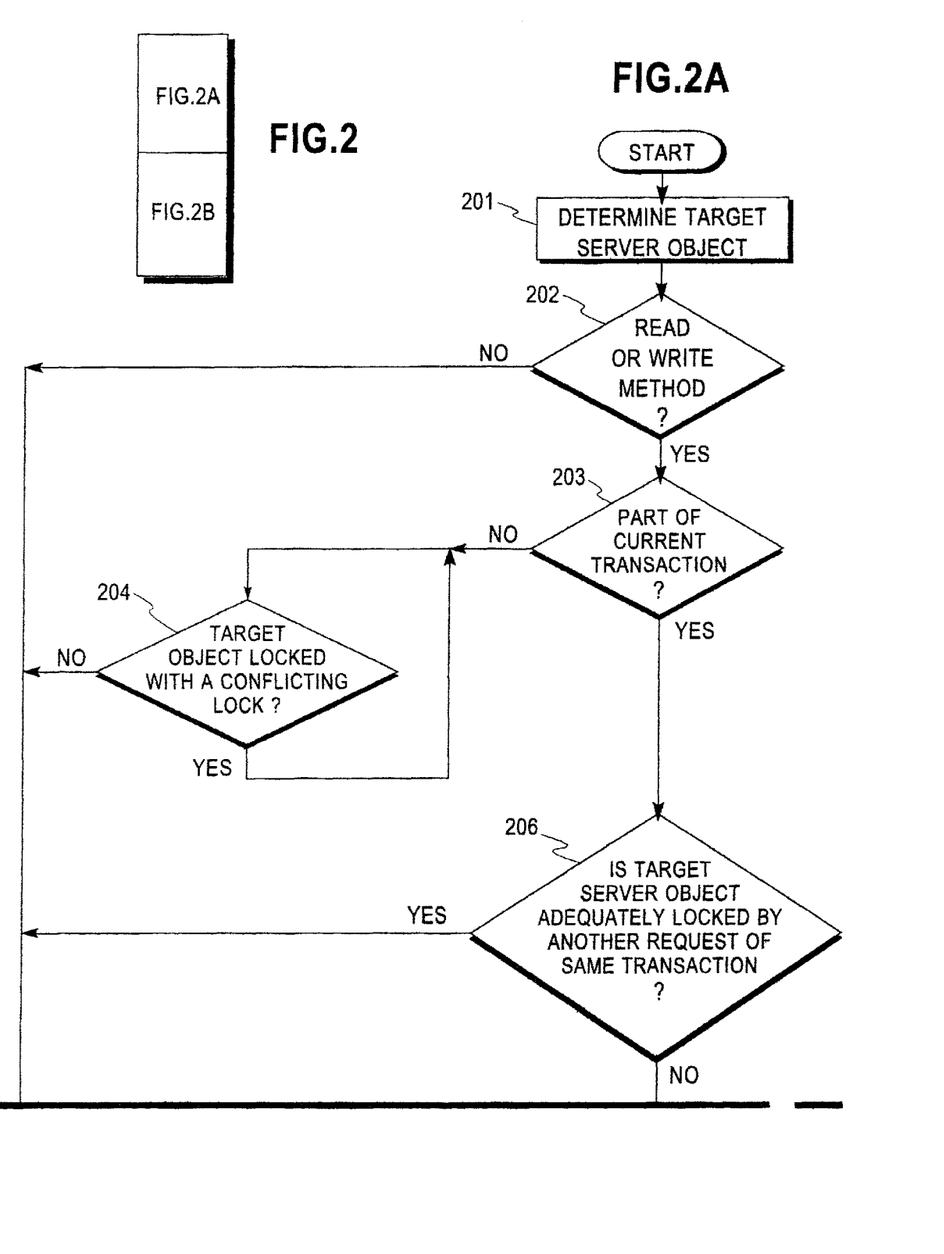
FIG. 2 is a flowchart showing the steps taken by an Object Request Broker in scheduling client requests and dealing with transactional concurrency issues, according to a preferred embodiment of the present invention.
Figure 2B:
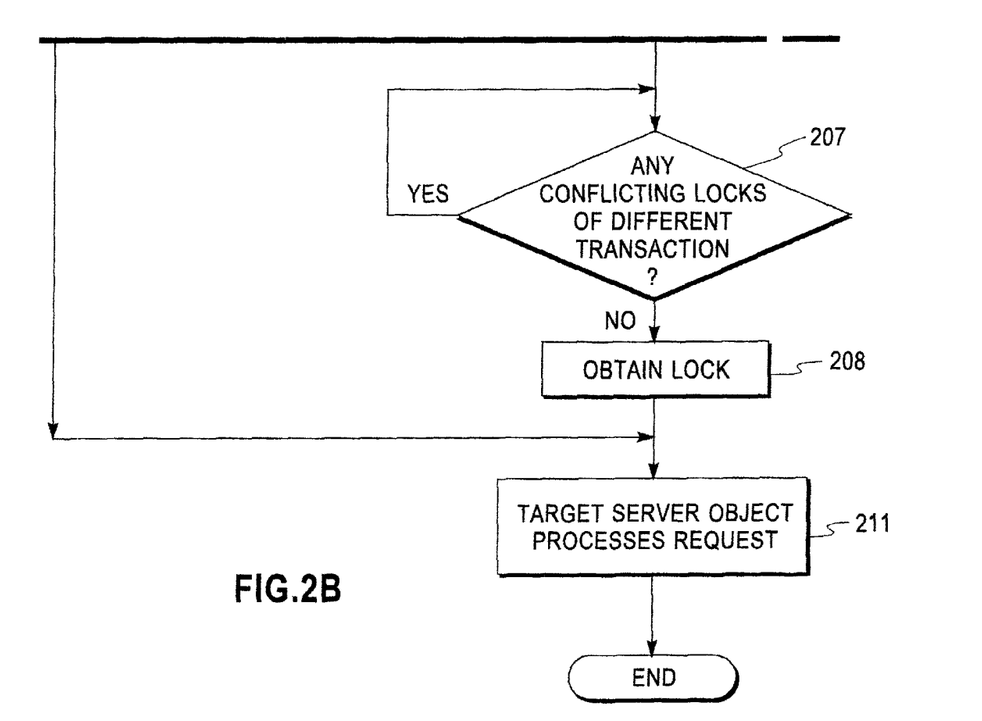

According to a preferred embodiment of the present invention, the ORB then checks (step 202) the method being requested of this target object in order to determine whether the request is requesting access to the target object's state data that maps directly to the storage media of the server computer system. That is, is the request trying to alter (write) or examine (read) a server object's encapsulated data which is stored in the storage media of the server computer system (i.e., the state data is expressed in its lowest level of abstraction, where the state elements are not implemented by further application objects but represented by basic types). If so, then flow proceeds to step 203 which will be described below. If not, the method included in the request is sent (or "dispatched") (step 211) for execution within the server by the target server object. That is, if the present client request is not trying to access (examine or alter) the state of the target server object, there is no concurrency issue with respect to other requests so the present request can simply be sent straight to the target server object for execution.

If a request reaches step 203, then the request is indeed requesting to either write or read a server object's encapsulated data which is stored in the storage media. At step 203, the ORB checks whether the present request is part of a transaction (by e.g., the ORB's checking of the service context of the request). That is, the ORB determines whether the request is part of a sequence of related requests all of which must either succeed or fail for the entire transaction to succeed (commit) of fail (abort). If it is not, then it is a "one-off" or isolated request and all that need be done is check (step 204) to determine whether access to the requested server object is already locked with a conflicting lock. If so, the "one-off" request must wait until the object becomes unlocked (e.g., until a currently "in-doubt" transaction becomes either committed or aborted) and then this request can be dispatched to the target server object for execution (step 211).

If at step 203 the request is identified by the ORB as being part of a transaction, the ORB checks (step 206) to see whether access to the requested server object has already been locked in the required mode by a previous request belonging to the same transaction. That is, the ORB checks whether a previous co-transactional request has already adequately protected this object from concurrent requests external to the transaction and thus there is no need for this request to initiate further locks. For example, if a previous co-transactional request has already obtained a write lock on the object, and the present request is requesting to read the object's data, the object is already adequately protected. Thus, the request is simply sent to the target server object for execution (step 211). That is, in these situations, even though two requests may be trying to access the encapsulated data of the same object, this is not considered a problem as both requests belong to the same transaction so they are permitted (and expected) to work together.

If, however, the NO branch is taken at step 206, the ORB checks (step 207) to determine whether the request conflicts with a lock which has already been granted to a previous request belonging to another transaction. For example, the previous request has obtained a write lock on this object and the present request is trying to alter the same object's encapsulated data. This is known as a conflicting lock situation. This is the situation, for example, where a husband has already gained access to the family checking account and the wife subsequently tries to gain access from another ATM across town while the husband's transaction is still on-going. If there is a conflicting lock, the present request is made to wait until the current transaction is finished. In the example, the wife's request would have to wait until the husband's transaction has finished. Then, her request would obtain a lock on the server object (step 208) and then be sent to the target server object for execution (step 211), and her withdrawal request would be made on a checking account balance that has been lowered by the husband's completed transaction.

If, at step 207, there are no conflicting locks from another transaction, the ORB obtains a lock on the requested server object (at step 208). The details of how this lock is obtained will be explained below. Once access to the object is locked, the ORB sends (dispatches) the request to the target object (step 211) for execution. The object is now protected so that the transaction can proceed without worry that the object will be concurrently accessed by a request from another transaction. After the current transaction is completed, the ORB releases the lock.

Before a description of the details of the locking step 208 will be given, a short discussion of the well known concept of object linking will be given in order to provide a contextual understanding for the later discussion of locking.

Each inter-object request for access (either of the examine or alter type) to a server object is attempting to gain access to the object's state which is encapsulated within the server object. AS is common in object-oriented programming, an object can have other objects "contained" within it. For example, an object which represents a table of salaries for a particular department might have separate ("contained") objects relating to each person's salary included within this larger ("container") object. Instead of having data encapsulated within it, the container object's state consists of pointers to contained objects. When such a pointer is accessed, control is transferred to the "pointed to" object. Once control reaches this "pointed to" object, its state may have a pointer to yet another "pointed to" object. In this way, control "bounces" to a plurality of objects in sequence.

When the container object is created, the contained object is created at the same time. That is, the system must make room in storage for the contained object as it is making room for the container object. Correspondingly, when the container object is destructed, its allocated space is freed along with the space allocated to the contained object. The contained and container objects "live and die" together. This type of object linking is used when the "pointed to" object is intended to exist only so long as the "pointer" object exists.

As opposed to this container/contained relationship, one object can simply refer to another object, still having a pointer to this other object included as part of the state of the object. The "referred to" object exists independently of the referring ("pointer") object and thus does not "live and die" with the referring object. This type of object linking is used when the "pointed to" object is intended to exist whether or not the "pointer" object still exists.

As an example of such "bouncing" from one object to another, suppose a client is requesting a server to add money to a particular bank account. Once the particular bank account server object receives this request via the server's ORB, the object contains a pointer to another server object called "account balance" so processing control is transferred to the contained "account balance" object from the "bank account" container object. A successive chain of flow from one object to another object thus occurs. Each bounce also passes through the ORB, as the ORB brokers all inter-object traffic.

In these situations where each successive object is in a container/contained relationship, a lock must be applied to each level of containment. That is, access to each of the container/contained objects must be locked. This prevents a conflicting request from performing a wholesale deletion of the container object (which would also destruct the contained object since they "live and die" together). For example, a container object listing a group of checking accounts including the contained object checking account being specifically requested by one client ATM must not be allowed to be deleted wholesale by a concurrent conflicting client request.

Thus, the ORB must not only lock the contained object, but it must also lock each container object which contains the requested object. The ORB recognizes the hierarchical (container/contained) structure among objects by looking at the class structure contained within the definition of the container object's class, and finding an attribute tag referring to the contained object. This attribute tag signifies that the container object contains the contained object. The tag is included in the standard CORBA IDL (Common Object Request Broker Architecture Interface Definition Language) standardized by the OMG. If one of these attribute tags is present, then the ORB knows that the relationship between two objects is container/contained as opposed to the other pointer relationship "refers to".

Once locking step 208 is reached in FIG. 2, in order to collect all of these linked objects for locking purposes, the ORB makes use of its running stack (in memory) of all requests which it is brokered but which have not yet completed execution. That is, the stack lists all objects which control has bounced amongst while following the pointers from object to object. The contents of this stack is continually changing. It is added to as the ORB receives a method to broker and it is subtracted from once an object which has been called by another object returns from this call. At any one time, the stack contains a listing of each object which has pointed to another object, and the pointed to object. This stack is well-known and is included in the ORB. The present invention makes use of the stack for automatic locking as will be described below.

Once the ORB receives a request which examines or alters the state data of the object as expressed in its lowest level of abstraction i.e., that maps directly to the storage media of the system, the stack, at this point in time, lists all of the objects in the containment chain, from the object at the highest level of containment down to the object at the lowest level of containment. As the chain is complete, assuming step 208 is reached through steps 202, 203, 206 and 207, locks are now placed on the objects listed in the stack as will be described below. Once these locks are placed, the request is dispatched (211) for execution and the server object performs the requested processing (which includes a read or write to its encapsulated state data).

Figure 3:
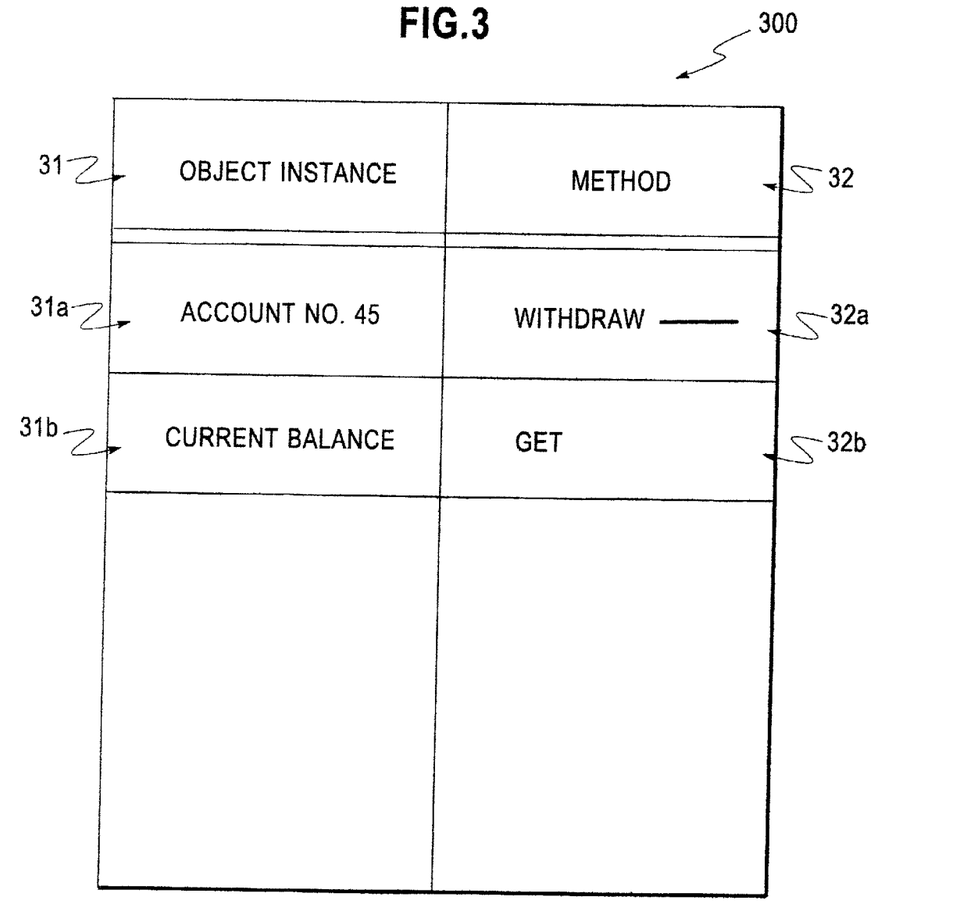
FIG. 3 is an example of a stack of object instance/method pairs, such a stack being used to perform automatic locking according to preferred embodiments of the present invention.

The two-column stack is shown in FIG. 3. One column 31 lists the chain of object instances involved in the bouncing from one object instance to the next object instance. The other column 32 lists (alongside each object instance) the method which is also pointed to as the method which is involved in invoking the pointed to object. These are the methods which the ORB has brokered and has not yet exited therefrom.

As an example, suppose a client is requesting that a withdrawal of $200 be made from a specific checking account designated by the bank (server) as checking account number 45. The ORB receives this client request for access to a first server object "account number 45", and "withdraw $200" is the method (and associated parameter) which the client wants the server to invoke on this object instance. In FIG. 3, this object instance/method pair is added to the stack 300 as elements 31a/32a.

When the server object instance "account no. 45" receives the request, its encapsulated state is accessed via its method "withdraw ", and upon such access, it is determined that there is a pointer to another object "current balance" and method "get". The object "current balance" is of a fundamental type mapping directly to system storage. It's methods are generic access methods (i.e., "get" or "set") which are system-provided and not defined within the application program. In order for the system to be able to withdraw money from an account, it must first know the current balance in the account. This is why there has been a bounce to this object. Thus, the first server object "account number 45" sends an intra-server request (through the ORB) to the second server object "current balance". The first server object contains the second server object. Because of the bounce, the new pair 31b/32b gets added to the stack 300.

In a like manner, each "bounced to" pair gets added to the stack as the ORB brokers methods. The ORB continually checks the stack to determine whether the most recently added pair includes a method which examines or alters state data of its corresponding paired object that maps directly to the storage media (step 202 of FIG. 2). Once the ORB determines that a recently added pair has this relationship, at this stage, the other steps 203 and onwards of FIG. 2 are carried out by the ORB.

At step 208, the ORB determines which objects in the stack are container objects and then intent to read or intent to write locks (Ir or Iw) are placed on each of the container objects (these are the objects which have an attribute indicator in their class definitions identifying the contained object). Whether the intent locks are intent to read or intent to write locks depends on whether the method in the pair which triggered the locking is attempting to examine or alter, respectively, the state of the corresponding object instance. A read (r) or write (w) lock is then placed on the object instance of the lock-triggering last pair in the stack. At this stage, locking is complete and the request is dispatched (step 211) by the ORB to the server object for execution within the transaction. When the ORB determines that the present transaction is completed (committed or aborted), all locks for that transaction are released.

Using the example shown in FIG. 3, once the pair 31b,32b is added to the stack 300, the ORB determines that this pair has a method which examines the state data of its paired object instance at the lowest level of abstraction of such state data (i.e., it is data of a basic type). That is, the method ("get") in this pair is requesting to read (because of the use of a generated low-level method—"get"—which returns the data of a fundamental type) the fundamental state data (the actual current balance of the user's account) as stored in the storage media of the computer system) of its paired object "current balance" 31b. The object "current balance" is defined to be of a fundamental type. The latter object is contained within object "account no. 45" 31a and object 31b does not contain a pointer to another object. Further, an attribute for object 31b can be found within the class definition of object 31a. Therefore, the ORB places an intent to read (ir) lock on object 31a (a read lock and not a write lock is used since method 32b is examining and not altering the state of object 31b) and a read lock on object 31b (for the same reason).

The ORB refuses to schedule later received requests which would conflict with the privilege it has already granted to a request belonging to another transaction in a previous lock. These locks are implemented within the server's ORB not within the service application (100). Thus, the server application writer does not have to be concerned with locking or transaction theory during development of a server application. These issues are instead handled by the ORB.

By placing locks in the order from top-level of containment downwards in the stack, deadlocks are avoided. Also, if it turns out that it is necessary to individually obtain read or write locks on a large number of methods of contained objects, the well-known concept of lock promotion can be used to obtain a read (r) or write (w) lock on the container level (rather than the contained level).

There is a small chance that in certain cases, an object/method pair in the stack will not be in the containment sequence of the other pairs (and thus the object which pointed to this object will not have an attribute tag identifying the object of the pair as being contained within it). This would occur, for example, when a container object "refers" to another object without "containing" the object.

Figure 4:
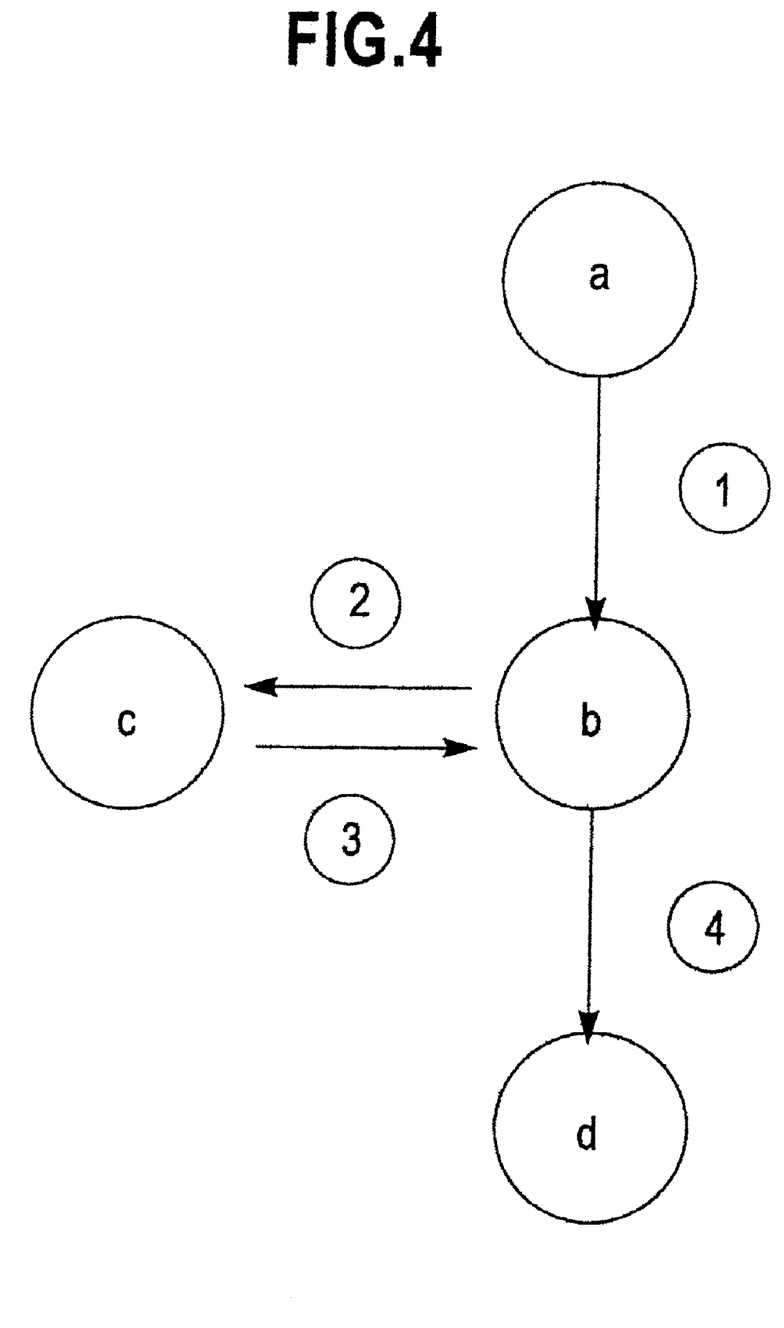
FIG. 4 is a chart showing an unusual "call relationship" amongst objects, which requires a modification in the basic system of the present invention.

As shown in FIG. 4, a container object instance "a" (which is received by the ORB from a client object instance and thus added to the stack) first calls another object instance "b" which object instance "a" contains (the circled numbers illustrate the time sequence of events, e.g., "first" "second" etc.). Object instance "b" is, accordingly, added to the stack which already contains object instance "a". Second, object instance "b" calls another object instance "c" which it does not contain. Object instance "c" is, accordingly, added to the stack which already lists object instances "a" and "b". That is, object instance "b" refers to object instance "c" but does not "contain" it. Third, object instance "c" refers back to object instance "b". Accordingly, object instance "b" is again added to the stack which already lists object instances "a", "b", and "c". Fourth, object instance "b" calls object instance "d" which object instance "b" does contain. Accordingly, object instance "d" is added to the stack which already lists object instances "a", "b", "c", "b" and "d".

If the ORB then determines that object instance "d" is at the lowest level of containment and that thus locking should take place, intent locks would be, according to the above description, placed on only object "b" listed in the stack (and a read or write lock placed on object "d"), as object "b" contains object "d" and object "c" does not contain object "b". Thus, object "b" appears to be at the top level of containment. However, the problem is that object "a", which should have an intent lock would not be given such a lock.

The way this unusual situation is dealt with is to treat each object as a node on a graph and treating each "container"/"contained" relationship (that is apparent from examining the state of the stack at the time of locking) as a directed edge in the graph. Once the object which is having its fundamental state altered (object "d" in the example of FIG. 4) is identified, we apply locks to all objects that have a path from the node that represents them in the graph to the locked object (object "d" in the example of FIG. 4). This will successfully lock objects (such as object "a") that are part of the "container"/"contained" sequence but are not linked directly by the linear "container"/"contained" sequence that is represented directly by the stack (not linked directly because of the existence of object instance "c" in the stack between object instances "a" and "b"). This will not result in objects, such as object "c", being locked, as object "c" does not have a path along directed edges to object "d" in the graph. We then lock object "d" with a read or write lock once the intent locks are placed on the container objects. The algorithms for path finding in a directed graph defined by connected pairs are well known and not discussed here.

In order to maintain transactional isolation in the event of a system failure (e.g. if the system crashes during a transaction) while a transaction is in doubt, the ORB reconstructs its locks as part of recovery of the system before application work re-commences. This is preferably done by having a recoverable lock facility in the transactionally aware locking toolkit.

While the preferred embodiment has been described as being carried out by an ORB, an object oriented programming language interpreter could also be used to perform the functions described. The best known example of such an interpreter is the Java virtual machine ("Java" is a trademark of Sun Microsystems) but others can also be used. An interpreter can determine "container"/"contained" relationships amongst objects from the semantics of the program logic statements that form the class definitions.

While the preferred embodiment has been described as beginning the locking procedure with respect to objects which directly attempt to read or write encapsulated data (step 202), other methods could also be made to trigger locking by using a marker (tag) in the class specification (Interface Definition Language or IDL) to identify such methods as having "read/write" functions with respect to the objects concerned. The tags would semantically state that a read/write lock should take place whenever the tagged method is brokered by the ORB.

In the above discussion, the locking is described under the assumption that a method in one transaction conflicts with the same method in another transaction. For example, a prior lock on an object triggered by the method withdraw( ) in a first transaction prevents the same method withdraw( ) in another transaction from being scheduled for a particular object until the first transaction is either committed or aborted. However, the conflict can also be defined to exist between one method and a subset of methods in the class. A class specification tag could be used to identify such relationships.

While a two-column stack has been described, a one column stack listing only the object instances could also be used, the corresponding methods are only important in determining whether fundamental state data (data which is accessed not via more objects, but directly by one object) of the most recently added object is being accessed. Thus, as the object instances are added to the stack, the corresponding methods can be examined and, if they do not meet this criteria, they can be discarded.

There are often situations where an object includes a pointer to a data structure (such as a list or tree). The object still "contains" the data structure, but each element (node) of the structure neither "contains" those below it nor simply references an independent structure. Each element is related to the others only by their inclusion in the structured format of the data structure. As a further enhancement to the present invention, such data structures can be taken into account by locking updates to the actual data values in an element of a data structure only with respect to other updates to the same data. Updates to pointers that maintain the topology of the data structure must be locked at the level of the whole data structure. This is done by recognizing methods that change the topology of the structure (e.g. add_node, delete_node, move_node, or any externalized pointer read/write methods) and lock these methods at the level of the whole overall data structure. Methods that simply read/write the value of the data at an individual element (node) are locked at the element level (with intent locks on the overall structure, such as described above for the "container/contained" situation which is more common).

The invention can also be embodied as a computer program product stored on a computer-readable storage medium, such as a magnetic disk hard drive, optical disk drive or semiconductor memory.

We claim:

1. A computer system comprising:
    a request broker for receiving work requests and dispatching them for execution within said computer system;
    processor means for processing said requests which have been received by said request broker to perform the requested work; and
    concurrency control means for performing concurrency control with respect to concurrent requests, said concurrency control means being located within said request broker and comprising an analysis component for analyzing the requested object and method included in the work request and a locking component for locking the brokering of the method,
    and wherein the locking component comprises:
    a stack component for creating a stack of object instances as the work request is transferred from one object to another;
    a determining component for determining the object at the top level of containment; and
    lock means for applying an intent lock on the object at the top level of containment.

2. The computer system of claim 1 wherein the request broker comprises an object-oriented programming language interpreter.

3. The computer system of claim 1 wherein, said means for performing concurrency control isolates the effects of a group of related work requests which form a transaction.

4. The system of claim 1 wherein said computer system is a server, said work requests are received at said server from at least one client computer system on a heterogeneous platform.

5. In a computer system, a process for performing concurrency control on work requests comprising the step of:
    (a) receiving a work request at a request broker for said system;
    (b) said request broker performing a concurrency control analysis on a requested object and method included in said work request; and
    (c) said request broker locking the brokering of said method, wherein the locking comprises the steps of:
    (c1) creating a stack of object instances as said work request is transferred from said requested object to at least one other object that said requested object calls;
    (c2) checking said stack to determine the object at the top level of containment and the object at the bottom level of containment; and
    (c3) applying an intent lock on said object at the top level of containment.

6. The process of claim 5 wherein said analyzing step (b) includes sub-steps of:

(b1) checking whether said first work request is requesting access to said object's fundamental state data of a basic type that maps directly to the storage media of the computer system; and (b2) checking whether said first work request is part of a current transaction.

7. The process of claim 6 wherein said analyzing step (b) further includes sub-steps of:

(b3) checking whether the object associated with said work request is already locked by a previous request belonging to the same transaction as said work request; and (b4) checking whether the object associated with said work request is already locked by a conflicting lock belonging to a transaction different from the transaction of said work request.

8. The process of claim 5 wherein said locking step (c) further includes sub-steps of:

(c4) applying intent locks on any remaining objects in the stack from the top-level of containment down to, but not including, the bottom level of containment; and (c5) applying a read or write lock on said object at the bottom level of containment.

9. The process of claim 5 wherein at said sub-step (c2) an attribute tag of a container object class definition is examined to determine the level of containment.

10. The process of claim 5 wherein said computer system is a server, said work requests are received at said server from at least one client computer system on a heterogeneous platform.

11. The process of claim 5 wherein said steps (a), (b) and (c) are performed by an object-oriented programming language interpreter.

12. A computer program product stored on a computer-readable storage medium, said product having code means for performing the functions recited in claim 5.

* * * * *